(12) United States Patent
Markman et al.

(10) Patent No.: US 9,552,353 B2
(45) Date of Patent: Jan. 24, 2017

(54) SYSTEM AND METHOD FOR GENERATING PHRASES

(75) Inventors: Vita G. Markman, Los Angles, CA (US); Michael Veprinsky, Encino, CA (US); Roger H. Hughston, Lancaster, CA (US); Andrew R. Beechum, Pasadena, CA (US); Arkady G. Trestman, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1169 days.

(21) Appl. No.: 13/011,659

(22) Filed: Jan. 21, 2011

(65) Prior Publication Data

US 2012/0191445 A1   Jul. 26, 2012

(51) Int. Cl.
*G06F 17/27* (2006.01)
*G06F 17/28* (2006.01)

(52) U.S. Cl.
CPC ....... *G06F 17/2785* (2013.01); *G06F 17/2827* (2013.01); *G06F 17/2872* (2013.01); *G06F 17/2881* (2013.01); *G06F 17/2775* (2013.01)

(58) Field of Classification Search
CPC .. G06F 17/27; G06F 17/2735; G06F 17/2775; G06F 17/2785; G06F 17/2809; G06F 17/2827
USPC ........................ 704/2, 4, 9, 10; 715/753, 758
See application file for complete search history.

(56) References Cited

U.S. PATENT DOCUMENTS

| | | | |
|---|---|---|---|
| 5,678,051 A * | 10/1997 | Aoyama | 704/2 |
| 6,139,201 A | 10/2000 | Carbonell et al. | |
| 6,470,306 B1 * | 10/2002 | Pringle | G06F 17/241 704/3 |
| 7,027,974 B1 * | 4/2006 | Busch et al. | 704/4 |
| 8,015,051 B2 | 9/2011 | Chen et al. | |
| 8,606,726 B2 | 12/2013 | Wurzer | |

(Continued)

FOREIGN PATENT DOCUMENTS

| | | |
|---|---|---|
| WO | 02070088 A1 | 9/2002 |
| WO | 04001558 A2 | 12/2003 |
| WO | 2008109680 A1 | 9/2008 |

OTHER PUBLICATIONS

Mine et al. "Building a massively multiplayer game for the million: Disney's Toontown Online." Computers in Entertainment (CIE) 1.1, Oct. 2003, pp. 1-20.*

(Continued)

*Primary Examiner* — James Wozniak
(74) *Attorney, Agent, or Firm* — Patterson + Sheridan, LLP

(57) ABSTRACT

Techniques are disclosed for generating phrases for selection by users communicating in an online virtual world environment. A phrase generation engine automatically constructs new phrases using pre-approved words from a dictionary of frequently used words and language-specific rules for phrase formation to ensure safety and supplement an existing database of commonly used, pre-approved phrases. Increasing the number of phrases that are available for selection by a user increases the user expressivity. Each word in the dictionary is annotated with semantic and grammatical information that constrains how the word is combined with other words to generate a new phrase. Each new phrase may also be tagged to enable translation into a different language so a phrase in a first language selected by a first user may be displayed in a second language to a second user.

21 Claims, 10 Drawing Sheets

(56) References Cited

U.S. PATENT DOCUMENTS

| | | | |
|---|---|---|---|
| 8,719,006 B2* | 5/2014 | Bellegarda | G10L 13/10 704/1 |
| 9,122,674 B1* | 9/2015 | Wong | G06F 17/28 |
| 2001/0029455 A1 | 10/2001 | Chin et al. | |
| 2002/0049805 A1 | 4/2002 | Yamada et al. | |
| 2002/0059379 A1 | 5/2002 | Harvey et al. | |
| 2002/0062349 A1 | 5/2002 | Maehiro et al. | |
| 2002/0140726 A1 | 10/2002 | Schwartz et al. | |
| 2003/0097406 A1 | 5/2003 | Stafford | |
| 2003/0187632 A1 | 10/2003 | Menich | |
| 2004/0102957 A1 | 5/2004 | Levin | |
| 2004/0111479 A1 | 6/2004 | Borden et al. | |
| 2005/0038650 A1* | 2/2005 | Bellegarda et al. | 704/231 |
| 2005/0076247 A1 | 4/2005 | Wittkotter | |
| 2005/0137851 A1* | 6/2005 | Ryu et al. | 704/5 |
| 2005/0154580 A1* | 7/2005 | Horowitz et al. | 704/9 |
| 2005/0203747 A1* | 9/2005 | Lecoeuche | 704/270.1 |
| 2005/0240439 A1 | 10/2005 | Covit et al. | |
| 2005/0278413 A1 | 12/2005 | Tannenbaum | |
| 2005/0288931 A1* | 12/2005 | Kaneko et al. | 704/257 |
| 2006/0003838 A1 | 1/2006 | Kobayashi et al. | |
| 2006/0015324 A1* | 1/2006 | Pan | G06F 17/2881 704/9 |
| 2006/0095556 A1* | 5/2006 | Arnold et al. | 709/223 |
| 2006/0129633 A1 | 6/2006 | Potluri et al. | |
| 2007/0016401 A1* | 1/2007 | Ehsani et al. | 704/9 |
| 2007/0118357 A1 | 5/2007 | Kasravi et al. | |
| 2007/0150426 A1 | 6/2007 | Asher et al. | |
| 2007/0168511 A1 | 7/2007 | Brochu et al. | |
| 2007/0213975 A1* | 9/2007 | Shimoda et al. | 704/9 |
| 2008/0071521 A1 | 3/2008 | Larvet | |
| 2008/0098115 A1* | 4/2008 | Bouillet et al. | 709/227 |
| 2008/0195571 A1 | 8/2008 | Furuuchi et al. | |
| 2008/0215519 A1 | 9/2008 | Runge et al. | |
| 2008/0221998 A1* | 9/2008 | Mendelsohn et al. | 705/14 |
| 2008/0275692 A1* | 11/2008 | Chen | G06F 9/4448 704/8 |
| 2008/0288241 A1 | 11/2008 | Noda | |
| 2009/0049513 A1* | 2/2009 | Root et al. | 726/1 |
| 2009/0063127 A1* | 3/2009 | Izuha | G06F 17/2755 704/2 |
| 2009/0132528 A1 | 5/2009 | Albornoz et al. | |
| 2009/0210803 A1 | 8/2009 | Brignull et al. | |
| 2009/0245500 A1 | 10/2009 | Wampler | |
| 2009/0253513 A1 | 10/2009 | Ducheneaut et al. | |
| 2009/0271180 A1 | 10/2009 | Balegar et al. | |
| 2009/0299960 A1 | 12/2009 | Lineberger | |
| 2009/0319915 A1 | 12/2009 | Bates et al. | |
| 2010/0010800 A1* | 1/2010 | Rehberg | 704/9 |
| 2010/0050074 A1 | 2/2010 | Nachmani et al. | |
| 2010/0057463 A1* | 3/2010 | Weng et al. | 704/257 |
| 2010/0100371 A1* | 4/2010 | Yuezhong et al. | 704/9 |
| 2010/0153219 A1* | 6/2010 | Mei et al. | 705/14.73 |
| 2010/0169769 A1 | 7/2010 | Jimenez et al. | |
| 2011/0092221 A1 | 4/2011 | Zubas et al. | |
| 2011/0107239 A1* | 5/2011 | Adoni et al. | 715/757 |
| 2011/0154224 A1 | 6/2011 | Bates et al. | |
| 2011/0184718 A1 | 7/2011 | Chen | |
| 2011/0201387 A1 | 8/2011 | Paek et al. | |
| 2011/0270771 A1 | 11/2011 | Coursimault et al. | |
| 2011/0270820 A1 | 11/2011 | Agarwal | |
| 2012/0036147 A1* | 2/2012 | Borst et al. | 707/769 |
| 2012/0054645 A1 | 3/2012 | Hoomani et al. | |
| 2012/0072404 A1 | 3/2012 | Murphy et al. | |
| 2012/0101970 A1 | 4/2012 | Zernik et al. | |
| 2012/0166183 A1* | 6/2012 | Suendermann | G06F 17/30654 704/9 |
| 2012/0323565 A1 | 12/2012 | Hildreth et al. | |
| 2013/0046791 A1 | 2/2013 | Markman et al. | |
| 2013/0047099 A1 | 2/2013 | Markman et al. | |
| 2014/0114895 A1 | 4/2014 | Beechum et al. | |

OTHER PUBLICATIONS

Park et al. "Communication supports for building world wide internet game communities." Entertainment Computing—ICEC 2006, pp. 370-373.*

Langkilde, Irene, and Kevin Knight. "Generation that exploits corpus-based statistical knowledge." Proceedings of the 36th Annual Meeting of the Association for Computational Linguistics and 17th International Conference on Computational Linguistics—vol. 1. Association for Computational Linguistics, May 1998, pp. 704-710.*

Iordanskaja, Lidija, Richard Kittredge, and Alain Polguere. "Lexical selection and paraphrase in a meaning-text generation model." Natural language generation in artificial intelligence and computational linguistics. Springer US, 1991, pp. 293-312.*

Harbusch, Karin, et al. "The Sentence Fairy: a natural-language generation system to support children's essay writing." Computer Assisted Language Learning 21.4, Oct. 2008, pp. 339-352.*

Montero, Calkin S., and Kenji Araki. "Is it correct?: towards web-based evaluation of automatic natural language phrase generation." Proceedings of the COLING/ACL on Interactive presentation sessions. Association for Computational Linguistics, Jul. 2006, pp. 5-8.*

Montero, et al. "Unsupervised language independent genetic algorithm approach to trivial dialogue phrase generation and evaluation." Natural Language Processing and Information Systems. Springer Berlin Heidelberg, 2007, pp. 388-394.*

Xu, Zhi, et al. "Filtering offensive language in online communities using grammatical relations." Proceedings of the Seventh Annual Collaboration, Electronic Messaging, Anti-Abuse and Spam Conference. Jul. 2010, pp. 1-10.*

Callaway, et al. "Narrative prose generation." Artificial Intelligence 139.2, Aug. 2002, pp. 213-252.*

Ratnaparkhi, Adwait. "Trainable approaches to surface natural language generation and their application to conversational dialog systems." Computer Speech & Language 16.3, Oct. 2002, pp. 435-455.*

Dinh, Dien, et al. "Learning Transfer Rules from Annotated English-Vietnamese Bilingual Corpus." IPSJ SIG Technical Report, Dec. 2004, pp. 31-36.*

Toutanova, et al. "Extensions to HMM-based statistical word alignment models." Proceedings of the ACL-02 conference on Empirical methods in natural language processing—vol. 10. Association for Computational Linguistics, Jul. 2002, pp. 87-94.*

Ghayoomi M et al: "An overview on the existing language models for prediction systems as writing assistant tools", Systems, Man and Cybernetics, 2889. SMC 2889. IEEE International Conference on, IEEE, Piscataway, NJ, USA, Oct. 11, 2889 (Nov. 18, 2889), pp. 5883-5887.

Hunnicutt S Ed—Tubach J P et al: "Using Syntactic and Semantic Information in a Word Prediction Aid", Proceedings of the European Conference on Speech Communication and Technology (EUROSPEECH). Paris, Sep. 26-28, 1989; [Proceedings of the European Conference on Speech Communication and Technology (EUROSPEECH)], Edinburgh, CEP Consultants, GB, vol. 1, Sep. 26, 1989 (1989-89-26), pp. 191-193.

Boehret, Katherin; "The Mossberg Solution: Rating the New Instant-Messaging Programs"; Feb. 7, 2007; Wall Street Journal; Eastern edition; New York, N.Y. (0099-9660). P.D.1.

Max Kaufmann: "Syntactic Normalization of Twitter Messages", The 8-th International Conference on Natural Language Processing, Jan. 1, 2010 (Jan. 1, 2010).

U.S. Appl. No. 14/059,306; entitled "Real-Time Search and Validation of Phrases Using Linguistic Phrase Components", filed Oct. 21, 2013.

U.S. Appl. No. 13/873,455; entitled "Comprehensive Safety Schema for Ensuring Appropriateness of Language in Online Chat", filed Apr. 30, 2013.

Method for Chat Spam Prevention in a Virtual World, Oct. 31, 2008, IP.com.

* cited by examiner

SYSTEM AND METHOD FOR GENERATING PHRASES

BACKGROUND

Field of the Invention

The present invention relates to online communication and, in particular, to chat messages exchanged between users in online gaming and social environments.

Description of the Related Art

Multiplayer online games and virtual worlds are popular forms of online entertainment. Both generally include computer users simultaneously logging into a computer network and interacting with each other in a computer simulated environment. The computer users are generally represented by a virtual avatar. Each computer user may control their avatar to move through the simulated environment, achieve gaming objectives and/or chat with other users and/or non-player characters.

User-to-user communication is generally a prominent feature within any online environment. To promote civility and safety among users, online environment providers generally employ safety or filtering features which reduce obscene language or other inappropriate communication. For example, in some formats, a user may chat directly with another user in real-time by typing characters (letters or symbols) directly into a text-field and sending a message to the other user. In this case, an online environment provider may process and filter user-to-user chat messages by removing swear words, slurs, or other known terms of disparagement. In another example, an online environment provider may disallow freely typed chat messages. Instead, a process is provided where a pre-approved choice of words or phrases is provided for a user to select and communicate other users. The particular pre-approved phrases that are displayed for the user to select from may be determined as possible completions or matches for what the user is typing. For example, if a user types "hel" displayed phrases for selection may include "hello," "hello how are u?," "hello there," etc. Because the user is constrained to select an exact full phrase from the list of displayed pre-approved phrases, the phrase cannot be manipulated to say something inappropriate. Therefore, the user typing "hel" will not be able to send a message saying "hell."

While safety is a prerequisite for phrase chat, to be successful, phrase chat must also be sufficiently expressive. Users should be able to say as much as possible within the bounds of safe, game-related chat. Any words or phrases that are pre-approved are manually predetermined by the online environment provider. One crucial problem in this respect is that enough phrases or words must be approved for inclusion in the database of pre-approved phrases, so that the user has enough selections to complete his/her phrase.

SUMMARY

One embodiment of the invention provides a computer implemented method for generating phrases. The generated phrases are presented to users for selection when a chat program is used in an online virtual world environment. The method generally includes the automatic generation of phrases from a set of approved words that are annotated with semantic and grammatical information. The semantic and grammatical annotated words are combined into phrases via language-specific rules. The generated phrases may also be used to facilitate a semi-automated translation process by first building the phrases in the relevant languages, tagging them with semantic tags that correspond to the phrases' core meanings, and then retrieving the phrase corresponding to the tag in the target language.

An embodiment of the invention includes a computer-implemented method for generating phrases. The method may generally include receiving words that are annotated with grammatical information, where the annotated words are organized into groups based on meanings of the annotated words. Phrases are generated using combinations of the annotated words based on the grammatical information, phrase formation rules, and the groups. The generated phrases are stored in a memory.

Another embodiment of the invention includes a computer-implemented method for translating phrases from a first language to a second language. The method may generally include receiving a first phrase that is represented in a first language and determining a semantic tag for the first generated phrase, where the semantic tag includes a verb and a verb argument extracted from the first generated phrase. The verb and the verb argument are translated into a second language to produce a translated semantic tag. A second phrase that is represented in a second language and that corresponds to the translated semantic tag is retrieved. The second phrase may be sent to a user of an online environment.

Other embodiments include, without limitation, a computer-readable medium that includes instructions that enable a processing unit to implement one or more aspects of the disclosed methods as well as a system configured to implement one or more aspects of the disclosed methods.

One advantage of the techniques described herein is that phrases are automatically generated using annotated words to increase the number of pre-approved phrases that are available for a user to select during a chat program. Another advantage of the techniques described herein is that a pre-approved phrase selected by a first user may be translated into a different language for display to second user.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
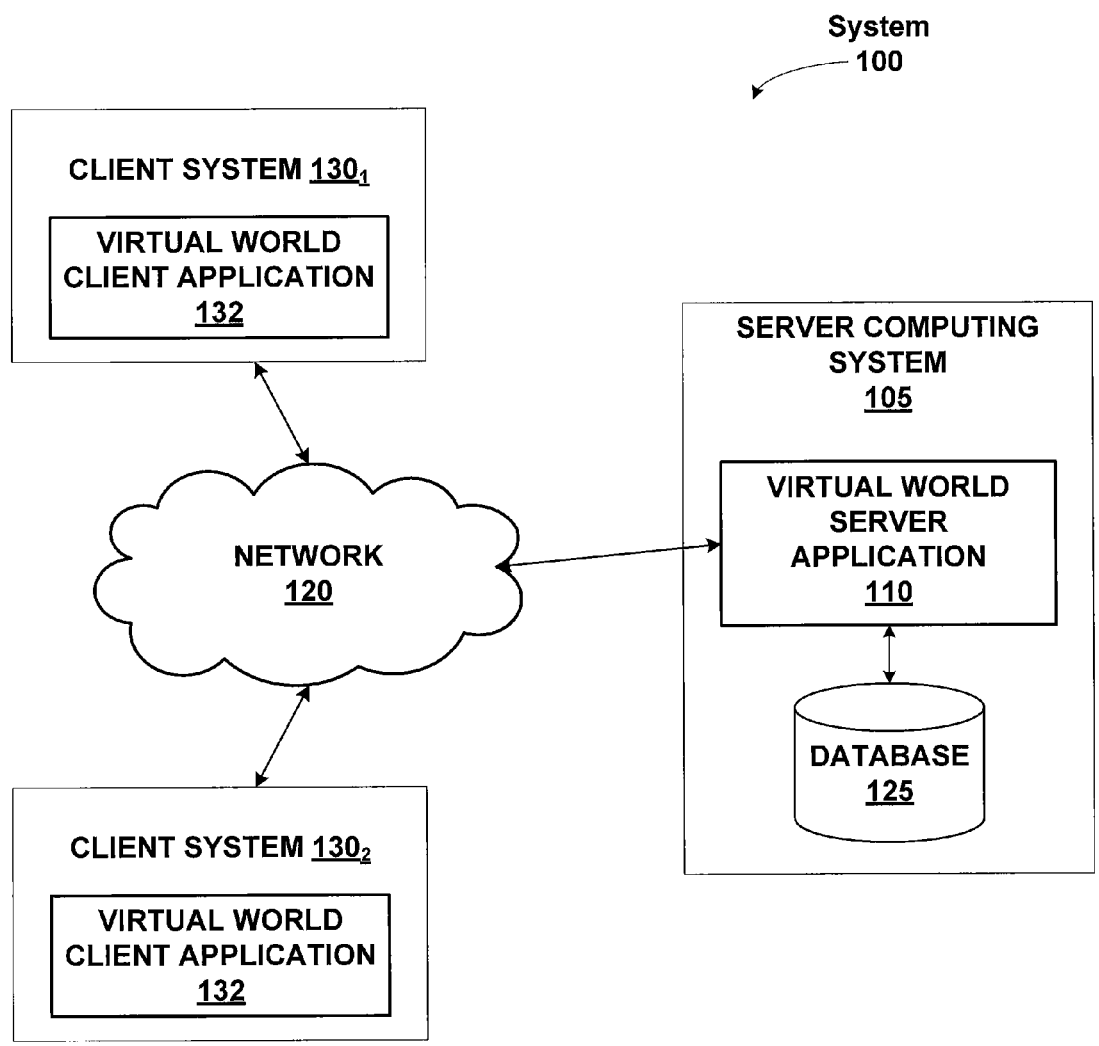
FIG. 1 illustrates a computing infrastructure configured according to one embodiment of the invention.

Embodiments of the invention include a system for generating phrases for selection by users communicating in an online virtual world environment. The generated phrases are composed of pre-approved words to ensure safety and supplement an existing database of commonly used, pre-approved phrases. Increasing the number of phrases that are available for selection by a user increases the range of expressivity available to users. A phrase generation engine automatically constructs new phrases using pre-approved words from a dictionary of frequently used words and language-specific rules for phrase formation. Each word in the dictionary is annotated with semantic and grammatical information that constrain how the word is combined with other words to generate a new phrase. Each new phrase may also be tagged to enable translation into a different language so a phrase in a first language selected by a first user may be displayed in a second language to a second user.

One embodiment of the invention provides a computer-implemented method for generating phrases. The method may generally include receiving words that are annotated with grammatical information, where the annotated words are organized into groups based on meanings of the annotated words. Phrases are generated using combinations of the annotated words based on the grammatical information, phrase formation rules, and the groups. The generated phrases are stored in a memory and/or on a hard disk.

Another embodiment of the invention provides a computer-implemented method for translating phrases from a first language to a second language. The method may generally include receiving a first phrase that is represented in a first language and determining a semantic tag for the first generated phrase, where the semantic tag includes a verb and a verb argument extracted from the first generated phrase. The verb and the verb argument are translated into a second language to produce a translated semantic tag. A second phrase that is represented in a second language and that corresponds to the translated semantic tag is retrieved. The second phrase may be sent to a user of an online environment.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a computing infrastructure configured for contextual filtered chat based on behavior and usage, according to one embodiment of the invention. As shown, the computing infrastructure 100 includes a server computer system 105 and a plurality of client systems $130_{1-2}$, each connected to a communications network 120. The server computer 105 includes a virtual world server application 110 and a database 125.

In one embodiment, the computing infrastructure 100 may include existing computer systems, e.g., desktop computers, server computers, laptop computers, tablet computers and the like. The computing environment 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations or network appliances lacking non-volatile storage. Further, while FIG. 1 illustrates a client-server model, other models are contemplated such as a peer-to-peer model.

In one embodiment, each client system $130_{1-2}$ communicates over the network 120 to interact with a virtual world application provided by the server computer system 105. Each client $130_{1-2}$ may include a virtual world client used to create a connection with the server system 105 and to receive and render the virtual world online environment. For example, the virtual world server application 110 receives commands representing the actions of a connected client's virtual character or avatar and tracks the status and movement of each virtual character or avatar within the online environment. The virtual world server application 110 in turns sends updates to each connected client system $130_{1-2}$.

Figure 2A:
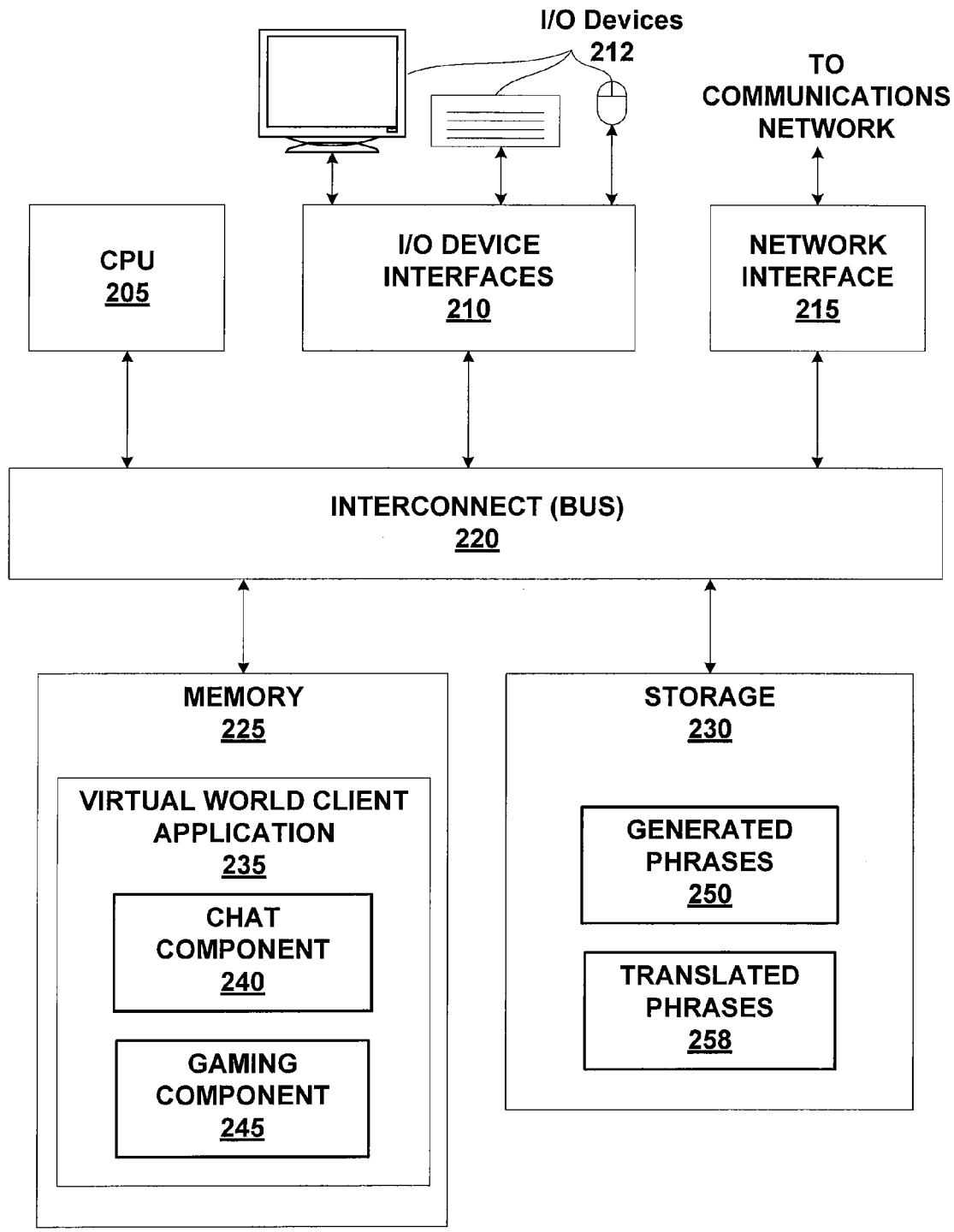
FIG. 2A is a more detailed view of the client computing system of FIG. 1, according to one embodiment of the invention.

FIG. 2A is a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The client computing system 130 may also include an I/O devices interface 210 connecting I/O devices 212 (e.g., keyboard, display and mouse devices).

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive (e.g., a solid state device (SSD)), may store non-volatile data.

Illustratively, the memory 225 includes a virtual world client application 235, which itself includes a chat component 240 and a gaming component 245, and the storage 230 stores a list of generated phrases 250 and translated phrases 258. In one embodiment, at least a portion of the generated phrases 250 and/or translated phrases 258 is stored or cached in the memory 225. Using the I/O devices, the client computing system 130 may display a virtual world as instructed by the virtual world client application 235. The virtual world client application 235 renders a virtual world having virtual locations and virtual characters, including an avatar controlled by the user. For example, the client application may display a three-dimensional map, representing the virtual world and numerous characters through the map, representing both avatars controlled by other users in the online environment and non-player characters. The virtual world client application 235 may also transmit user commands and updates to the virtual world server so as to notify the server of changes in position and/or action of the user's avatar.

In one embodiment, the chat component 240 provides user-to-user chat functions within the virtual world. The chat component 240 may be configured to transmit and receive chat messages from the virtual world application server. The chat component 240 may store messages sent and received by the user as well as provide a chat history. The chat component 240 may be configured to present a list of phrases that one user may select to send as a chat message to another user (i.e., the generated phrases 250). The list of phrases that is presented to the user may be based on characters typed by the user, so that the phrases in the list match the typed characters, thereby performing an auto-completion feature. The virtual world server application 110 may also transmit updates to the client application 235 to add new phrases to the generated phrases 250 and/or the translated phrases 258.

The gaming component 245 provides a user with a single- or multi-player gaming experience. The gaming component 245 may provide any variety of games to a user, including but not limited to action games, puzzle games, and word games. The games may be stored wholly locally within the client system 130 or may be hosted by a server computing system 105. The gaming component 245 may transmit gaming information and results to the connected virtual world server application. The chat component 240 and gaming component 245 may also be interconnected. For example, the chat component 240 may permit a user to chat with another user in-game, while playing a game provided by the gaming component 245.

Figure 2B:
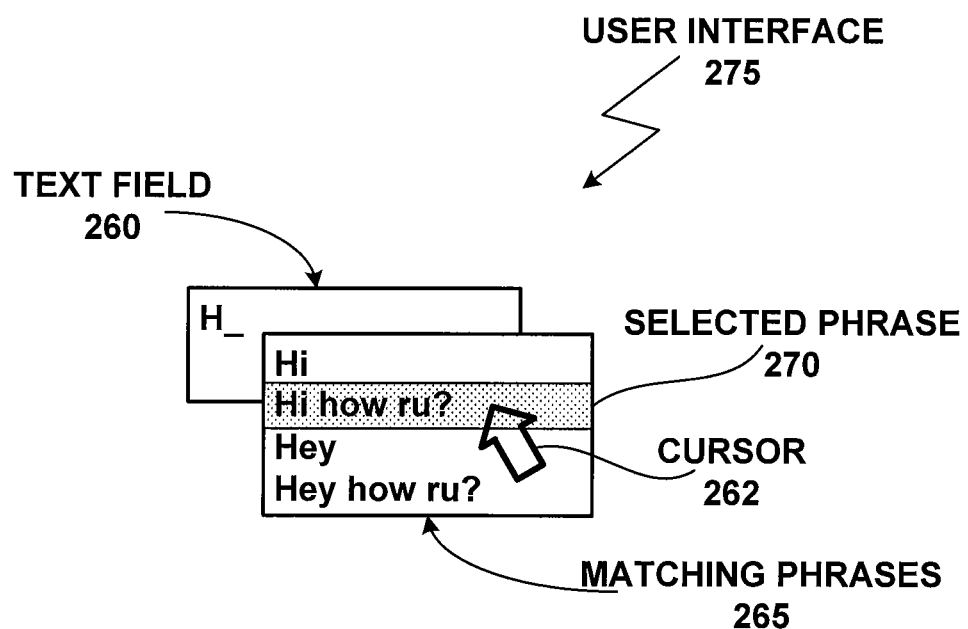
FIG. 2B illustrates a user interface presented to a user of the client computing system of FIG. 1, according to one embodiment of the invention.

FIG. 2B illustrates a user interface 275 presented to a user of the client computing system of FIG. 1, according to one embodiment of the invention. The chat component 240 may provide a text field 260 which allows the user to compose chat messages sent to other users. In such a case, the user may begin to compose a chat message using combinations of characters. Phrases within the generated phrases 250 or translated phrases 258 that match the sequence of characters typed by the user are displayed for selection. As shown in FIG. 2B, the user has typed the letter "H" and four different phrases are displayed in matching phrases 265. In this manner, the chat component 240 presents the user with a list of matching phrases from the generated phrases 250 or translated phrases 258.

When the user types an additional character in a sequence that for which no matching phrases are found, the additional character typed by the user is not displayed. For example, if the user types the letter "B" following the "H" and if no matches are found in the generated phrases 250 or translated phrases 258, then the letter "B" is not displayed in the text field 260.

In this example, the user selects the selected phrase 270 using mouse cursor 262. The selected phrase 270 may be sent or transmitted to another user when the user releases a mouse-button or otherwise indicates that the message is complete and should be sent. The selected phrase 270 may be sent from the user controlling a first avatar to another user who controls a second avatar within the online gaming environment. Illustratively, the user controlling the first avatar has selected to send a chat message including the selected phrase to the user. In response, the chat client sends the chat message "Hi how ru?" to the user controlling the second avatar.

Figure 2C:
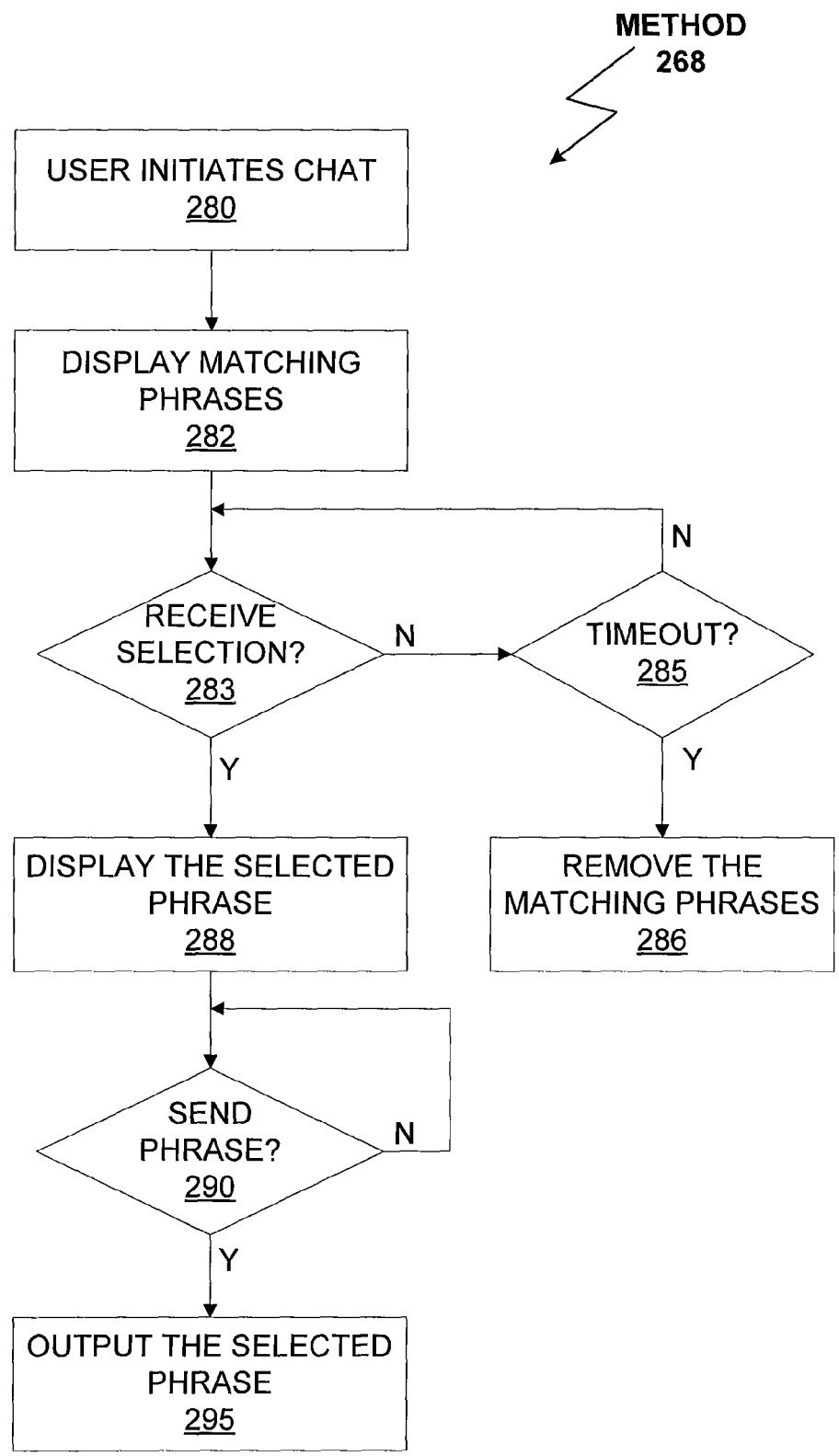
FIG. 2C is a flowchart of method steps describing how a user may select a generated phrase to send a chat message, according to one embodiment of the invention.

FIG. 2C is a flowchart of method steps 268 describing how a user may select a generated phrase to send in a chat message, according to one embodiment of the invention. Persons skilled in the art would understand that, even though the method 268 is described in conjunction with the systems of FIGS. 1 and 2A, any system configured to perform the method steps, in any order, is within the scope of embodiments of the invention. In one embodiment, the virtual world client application 235 may perform the method 268. As shown, the method 268 begins at step 280, where a user initiates the chat function by entering a character in the text field 260. At step 282 the chat component 240 of the virtual world client application 235 displays the matching phrases 265.

At step 283, the chat component 240 determines if a selection has been received from the user, and, if not, then at step 285 the chat component 240 determines if a timeout has expired. To implement the timeout function, a counter or timer may be initialized when the matching phrases 265 are displayed at step 282. If, at step 285, the timeout has expired, then at step 286 the matching phrases 265 are removed and no longer displayed for selection. If, at step 285, the timeout has not expired, then the chat component 240 returns to step 283 to wait for a selection.

When a selection is received at step 283, the chat component 240 proceeds to step 288 and displays the selected phrase. At step 290 the chat component 240 determines if the user has indicated that the selected phrase should be sent to another user, and, if not, then the chat component 240 remains in step 290. When the user indicates that the selected phrase should be sent to the other user, the chat component 240 outputs the selected phrase to the other user through the communications network and server computing system 105 (step 295).

Allowing a user to select phrases from approved phrases (generated phrases 250 and translated phrases 258) may help provide a safe online environment for younger users, as user-interaction are limited to the displayed chat messages (referred to as "safe-chat"). In some cases, a user may be limited to communicating with others by selecting a phrase from a list of the generated phrases 250 or translated phrases 258 without typing in the text field 260. However, when the number of generated phrases 250 or translated phrases 258 is too large to be displayed, the user will need to type a character to initiate the display of matching phrases 265. The phrases in the list of matching phrases 265 presented to a user may be ordered by frequency of selection by users of the online environment.

As previously explained, conventional solutions for providing safe-chat solutions involve populating a phrase database with predefined exact phrases, e.g. if "I want pizza", "Let's play pixie hollow". When a new food item or a game becomes available, the full phrase has to be created for it, e.g. "I want donuts" or "Let's play chess" must be manually approved and added to the phrase database. The manual approval and entering of phrases entails significant overhead since for every new game typically requires entering 100 new phrases into a phrase data base.

In contrast with conventional solutions, the phrase generation engine generates phrases using all permissible combinations of words in a dictionary of approved words that have been annotated. While phrases may also be added manually, the number of phrases available for selection by a user is greatly increased. The expressivity of the chat environment is increased without a commensurate increase in cost compared with manually creating and entering all of the combinations of words that produce a permissible phrase. Additionally, the safety of the generated phrases is ensured by using approved words and phrase rules to combine the approved words that have been annotated. Finally, the solution allows for an easier translation process to convert phrases into different languages since individual phrases do not have to be translated word by word. Rather, the phrases may be generated in each individual language, tagged with their core meaning, and then a translated version of a generated phrase selected by a user may be identified using the tag and retrieved for output to a recipient.

Figure 3A:
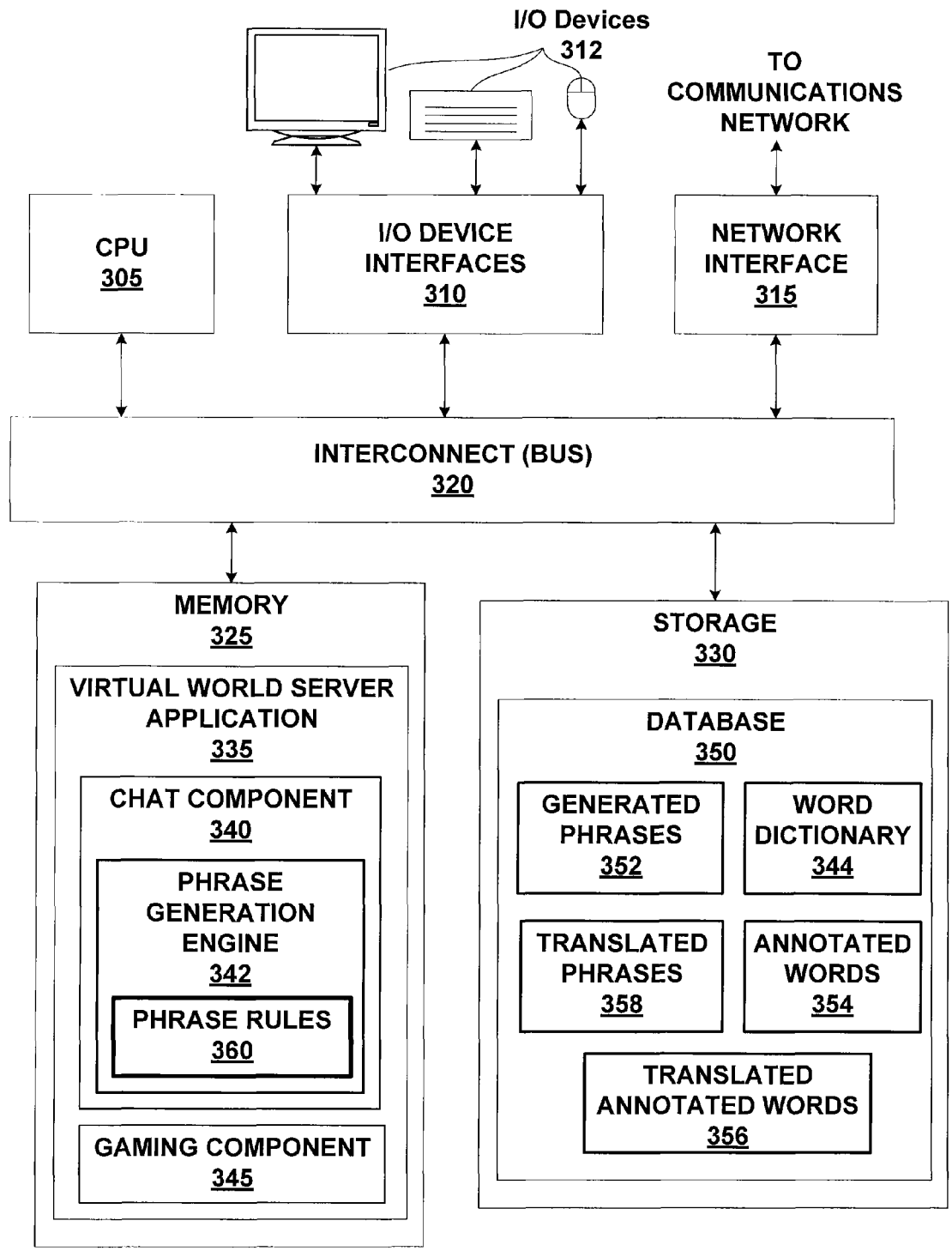
FIG. 3A is a more detailed view of the server computing system of FIG. 1, according to one embodiment of the invention.

FIG. 3A is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The server computing system 105 may also include an I/O device interface 310 connecting I/O devices 312 (e.g., keyboard, display and mouse devices).

Like CPU 205 of FIG. 2A, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, SSD drives, floppy disc drives, tape drives, removable memory cards, optical storage, network attached storage (NAS) or a storage area-network (SAN).

As shown, the memory 325 stores a virtual world server application 335, and the storage 330 includes a database 350 storing a word dictionary 344 including pre-approved words, annotated words 354, translated annotated words 356, generated phrases 352, and translated phrases 358. And the virtual world server application 335 includes a chat component 340 and a gaming component 345. In one embodiment, virtual world server application 335 hosts an online gaming environment to which one or more of the client computing systems 130 connect. The virtual world server application 335 controls the online environment experience and sends updates to connected virtual world clients regarding the current state of the virtual world.

The chat component 340, as mentioned above, may be configured to store and relay chat messages between users. The chat component 340 includes the phrase generation engine 342 that generates phrases using the annotated words 354 and the phrase generation rules 360, as described in conjunction with FIGS. 3B and 4A. The annotated words 354 include semantic and grammatical information corresponding to the words in the word dictionary 252. The translated annotated words 356 include semantic and grammatical information corresponding to translated versions of words in the word dictionary 252. According to one aspect, the chat component 340 may determine a translated phrase that matches a generated phrase selected by a first user for transmission to a second user and send the translated phrase (or identifier corresponding to the translated phrase) to the second user, as described in conjunction with FIGS. 5A and 5B. When the chat component 340 is configured to translate phrases the phrase generation engine 342 may be replaced with or include a phrase translation engine.

In one embodiment, the online environment may be configured to provide a customized user experience, based on user behavior and collaborative experiences. For example, the popularity of chat messages may change (sometimes rapidly) over time as a given phrase enters the vernacular of a given cohort (e.g., a group of 10-13 year old boys), subsequently becomes popular and then fades in use. Accordingly, updating the phrases in generated phrases 352 and translated phrases 358 (or safe-chat messages) when a new word is added to the word dictionary 344 allows the online environment to follow certain (e.g., cultural or popular) trends. Doing so provides an incentive for users to interact with one another using the safe chat methods.

Entering all the possible phrases that are combinations of the words in the word dictionary 344 manually is extremely costly and time consuming, and thus may not be a feasible option for creating all permissible phrases to ensure expressivity of phrase chat. For example, a conventional phrase database may contain a first phrase 'I want to play chess', and may not contain a second phrase 'I want to play checkers' even when chess and checkers both exist in the word dictionary 344. Therefore, the conventional system implementing safe-chat allows the user to select the first phrase, but does not allow the user to select the second phrase. The cost factor of manually entering all permissible phrases figures especially prominently when phrase chat is deployed on a multi-lingual platform, since the approximate cost of translation is typically twenty five cents per word and the translation of phrases cannot be performed by simply translating each individual word in the sentence since the grammatical rules vary for different languages.

Figure 3B:
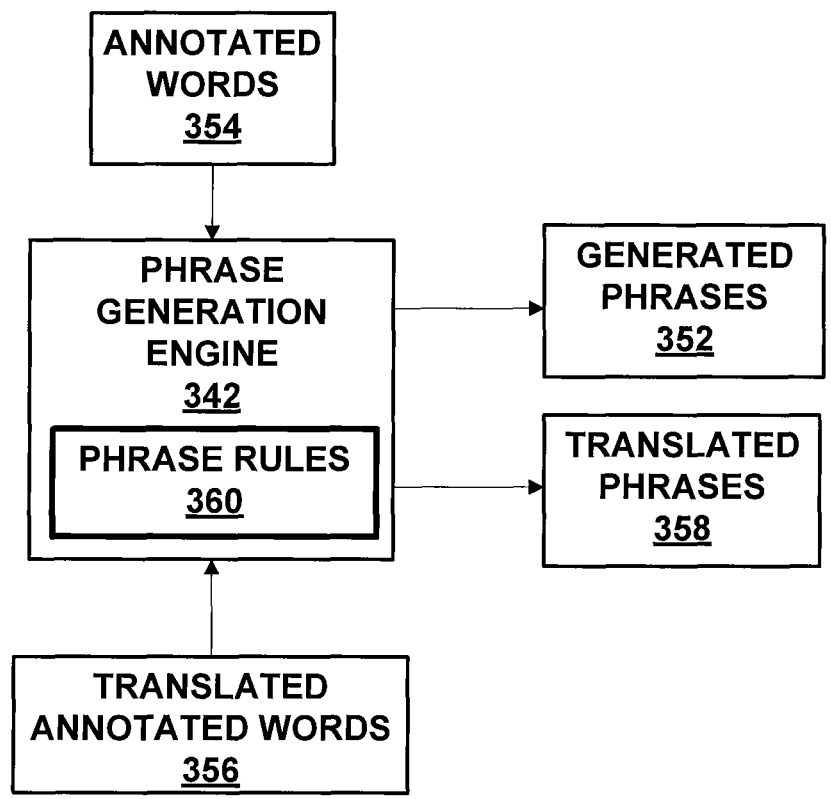
FIG. 3B is a conceptual diagram of the phrase generation components and inputs to the phrase generation engine that is configured to implement one or more aspects of the present invention.

FIG. 3B is a conceptual diagram of the phrase generation components, including the phrase generation engine 342 that is configured to implement one or more aspects of the present invention. The phrase generation engine 342 is stored in the memory 325 of the server computing system 105 and includes phrase rules 360. Inputs to the phrase generation engine 342 may include annotated words 354 and translated annotated words 356. When the phrase generation engine 342 is executed by the CPU 305, the generated phrases 352 and/or the translated phrases 358 are independently generated as outputs and stored in the database 350. In order to produce the translated phrases 358, the phrase rules 360 are defined for the language in which the translated phrases 358 are represented.

The generated phrases 352 are represented in a first language and the translated phrases 356 are represented in a second language. A particular phrase in the first language is associated with a phrase in the second language when the semantic tags for the phrases match. One phrase in the first language may not have a phrase with a matching semantic in the second language while another phrase in the first language may have a semantic tag that matches semantic tags for two or more phrases in the second language. Any new generated phrases or translated phrases may also be transmitted to the client systems 130 and stored in the generated phrases 250 and/or the translated phrases 258, respectively In some embodiments, the generated phrases 352 supplement an approved set of phrases that may be collected and proofread by moderators. The approved set of phrases may include the most commonly used phrases that cover about 50% of a 30 million line chat database (mostly short phrases such as 'lol' and 'hi'). In order for the phrase generation engine 342 be used to automatically construct new phrases from words in the word dictionary 344, the words are first manually annotated with semantic and grammatical information that constrains which words can be combined to form a phrase and how those words are combined to form a phrase. The phrase rules 360 define language-specific rules for sentence formation. Importantly, the phrase generation engine 342 offers a robust and speedy mechanism to augment a database of safe phrases automatically. Specifically, from a list of 4 nouns, 4 verbs, and 4 adjectives, 4×4×4=64 possible phrases may be generated by the phrase generation engine 342. Adding just one word to the annotated words 354 allows for the generation of 5×4×4=100 new phrases. For translation purposes, the phrases can be generated separately in multiple languages by the phrase generation engine 342 and then tagged with special identifiers to enable automated retrieval of a phrase from a first language to match a phrase in a second language.

Figure 4A:
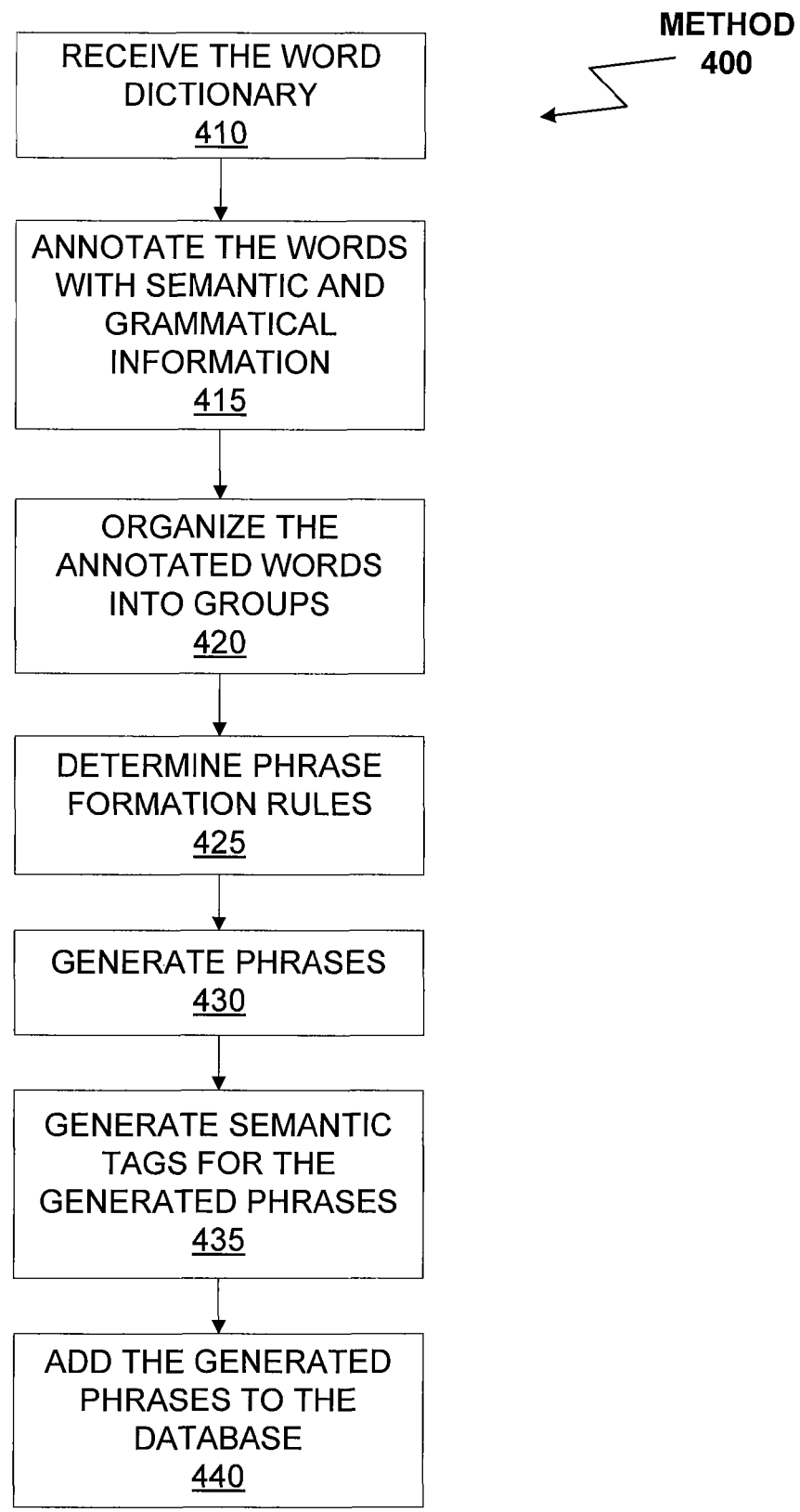
FIG. 4A is a flowchart of method steps describing the generation of phrases, according to one embodiment of the invention.

FIG. 4A is a flowchart of method steps describing the generation of phrases, according to one embodiment of the invention. Persons skilled in the art would understand that, even though the method 400 is described in conjunction with the systems of FIGS. 1, 2A, and 3A, any system configured to perform the method steps, in any order, is within the scope of embodiments of the invention. In one embodiment, the virtual world server application 335 may perform the method 400. As shown, the method 400 begins at step 410, where a virtual world server application 335 receives the word dictionary 344 including approved words. In one embodiment, the word dictionary 344 includes the most commonly used vocabulary words that are selected from 100,000+ lines of moderator-approved safe chat. The word dictionary 344 may also include words from white lists (the white lists may differ for each virtual world application) and additional game-related vocabulary provided by the moderators/product directors.

At step 415, each word is manually annotated with semantic and grammatical information. The semantic information specifies a category for the word that is based on the meaning of the word. For example, the semantic information may specify that the word denotes a food item, a clothing item, or an action. The grammatical information specifies the word's grammatical function, e.g., verb, noun, adjective, and the like. While the semantic categories should be specific, the categories should not be overly specific. That is, a "food" category and a drink category are appropriate, but not a 'cheeseburger' category and a 'soda' category are overly specific. At step 420, the annotated words are organized into different word groups depending on the semantic and grammatical information. For example, all nouns having a semantic category of food are organized into one word group, and all nouns having a semantic category of clothing are organized into another group.

At step 425, the phrase rules 360 that dictate how annotated words may be combined by the phrase generation engine 342 to form phrases are manually defined. Typically, 10-30 rules are defined for each language. For example, a first phrase rule for the English language may be defined as Sentence→Noun phrase Verb Phrase (phrase rule 1)

The above phrase rule 1 states that a phrase is expanded into a noun phrase (verb argument) and a verb phrase (verb+optional object). Phrase rule 1 also indicates that the noun phrase precedes the verb phrase. For example, using words such as {puffles, eat, pizza}, a phrase "Puffles eat pizza" is generated, where "puffles" is the noun phrase (verb argument) and "eat pizza" is the verb phrase that involves the verb "eat" and the object "pizza".

At step 430 the phrase generation engine 342 constructs all the possible phrases from the annotated words 354 (and translated annotated words 356) using the phrase rules 360 by combining every annotated word with the one or more other annotated words to produce the generated phrases 352 (and translated phrases 358).

At step 435 the phrase generation engine 342 automatically creates semantic tags for each generated phrase. A semantic tag reflects the core meaning of a generated phrase. For example, a phrase such as "I like pizza", will have a semantic tag Like(I=actor; pizza=object). The semantic tag may be assigned a numeric code as an identifier for fast retrieval from the generated phrases 352. At step 440 the generated phrases and corresponding semantic tags are added to generated phrases 352.

Steps 415, 420, 425, 430, 435, and 440 may be repeated as new words are approved and added to the word dictionary 344. The phrase generation algorithm used by the phase generation engine 342 provides a robust methodology for generating new safe phrases to augment an existing database of phrases collected from moderator-approved prior chat. Crucially, the phrase rules 360 only allow the combination of words when the semantic information for the words allows the combination. For example, "eat" may be combined with nouns in the food group. Thus, "eat" may be combined with "cake" but not with "chair" to form "eat cake" but not "eat chair" because "chair" is not in the "food" group. Notably, with just 50 adjectives, 50 nouns, and 50 verbs that can combine with each other 125,000 possible phrases may be automatically generated by the phrase generation engine 342. 50 adjectives×50 nouns×50 verbs=125,000 possible phrases. The robustness of the phrase generation engine 342 becomes further evident when the number of words in one of the categories is increased just by one to 51, so that 50×50×51=127,500 possible phrases. 2,500 phrases may be generated by adding just one new approved word to the annotated words 354.

To illustrate how phrase generation engine 342 functions in more detail, consider a very small vocabulary with semantic and (some) grammatical annotations:

I {pronoun, verb argument, 1st person, singular, human}
You {pronoun, 2rd person, human}
puffles {noun, 3rd person, plural, animal}
pizza, donuts {noun, 3rd person, plural, food}
Eat {verb, verb argument: human, animal; object: food}
Devour {verb, verb argument: human, animal; object: food}
Dance {verb, verb argument: human, animal; object: NONE}

Using phrase rule 1 (see above), the following phrases may be generated by the phrase generation engine 352:

I eat pizza
I eat donuts
I devour pizza
I devour donuts
You eat pizza
You eat donuts
You devour pizza
You devour donuts
Puffles eat pizza
Puffles eat donuts
Puffles devour pizza
Puffles devour donuts
I dance
you dance
puffles dance The total number of phrases that is created using {I, you, puffles} as the verb argument, {eat, devour} as verbs and {pizza, donuts} as objects is: 3×2×2=12. When another food item is added, the number of possible new phrases increases to 18. Each time that a new word enters the vocabulary and is approved, the word is categorized and annotated with the relevant semantic information, i.e. whether it is a food, place, or a clothing item. The annotations facilitate the automatic generation of new phrases, which helps keep phrase chat expressive.

The safety of the generated phrases is guaranteed by the fact that each word is annotated with semantic and grammatical information. Thus, while phrases generated using the phrase rule 1 are permissible and are generated by the phrase generation engine 342, the following phrases are not considered permissible and are therefore not generated by the phrase generation engine 342:

I dance pizza
Pizza eat you
Pizza eat puffles
You eat puffles
Puffles eat you

The phrases listed above are not generated because "eat" is specified to combine with annotated words in the "food" group not with annotated words in the "animals" or "people" groups. Thus, given the phrase rules 360 for phrase creation and the restrictions on which words can be combined together, new safe and grammatically permissible phrases are generated, while avoiding the generation of unsafe or undesirable phrases. The crucial strength of this approach is that it allows for the number of safe phrases to be dramatically increased by automatically generating phrases with guaranteed safety and minimal overhead. Adding just one more annotated word results in the generation of as many new phrases as there are annotated words that can combine with the new annotated word.

TABLE 1 lists a set of rules that may be included in the phrase rules 360 for the English language. The rules shown in TABLE 1 are representative examples and more rules may be defined for inclusion in phrase rules 360.

TABLE 1

| Rule | Structure | Example phrases |
|---|---|---|
| 1 | <np> <vp> WHERE | The cat runs |
|  | np[person] IN vp[person] OR | Some puffles eat pizza |
|  | np[number] = vp[number] | I like donuts |
|  | AND |  |
|  | np[number] IN vp[number] OR |  |
|  | np[number] = vp[number] |  |
|  | AND |  |
|  | np[semantic_subgroup] AND np[semantic_group] IN |  |
|  | vp[semantic_selection_verb argument] |  |
| 2 | <vp> WHERE | Eats pizza |
|  | vp[person] = $3^{rd}$ | Throws snowballs |
|  | AND |  |
|  | HEAD(vp)[transitivity] = transitive |  |
| 3 | <vp> WHERE | Runs fast |
|  | HEAD (vp) [person] = $3^{rd}$ | Eats quickly |
|  | AND |  |
|  | HEAD(vp)[transitivity] = intransitive |  |
|  | AND |  |
|  | <adverbial> IN vp |  |
| 4 | <vp> WHERE | Eat your soup! |
|  | HEAD vp[tense] = base |  |
|  | AND |  |
|  | HEAD(vp)[transitivity] = transitive |  |
| 5 | <vp> WHERE | Run fast! |
|  | HEAD vp[tense] = base | Eat quickly! |
|  | AND |  |
|  | HEAD(vp)[transitivity] = intransitive |  |
|  | AND |  |
|  | <adverbial> IN vp |  |
| 6 | <np> <aux> <vp> WHERE | He has run |
|  | np[person] IN aux[person] OR np[person]=aux[person] | We have eaten spinach |
|  | AND | We are driving |
|  | np[number] IN aux[number] OR np[number] =aux[number] | He will be driving |
|  | AND | You have been running |
|  | np[semantic_subgroup] AND np[semantic_group] IN |  |
|  | vp[semantic_selection_verb argument] AND |  |
|  | HEAD(vp)[aspect] = aux[possible_verb_forms_aspect] AND |  |
|  | HEAD(vp)[tense] = aux[possible_verb_forms_tense] |  |
|  | <interjection><phrase> OR |  |
|  | <connective><phrase> WHERE |  |
| 7 | <np> <vp> WHERE | She is cute |
|  | HEAD(vp) = 'be' AND | The cat is fat |
|  | ap IN vp AND |  |
|  | np[semantic_subgroup] AND np[semantic_group] IN |  |
|  | ap[semantic_selection_verb argument] |  |
| 8 | <np> <vp> WHERE | We are in the yard |
|  | HEAD(vp) = 'be' AND | We are at the mall |
|  | pp IN vp AND |  |
|  | np[semantic_subgroup] AND np[semantic_group] IN |  |
|  | pp[semantic_selection_verb argument] |  |

The first phrase rule in the rules column of TABLE 1 is the basic rule for phrase generation. The np is a verb argument (noun phrase) or word and vp is the verb phrase or word. The second phrase rule (rule 2) is used to generate verb phrases. The third phrase rule (rule 3) is used to generate phrases where intransitive verbs are combined with adverbs, where HEAD(vp)=verb. The fourth phrase rule (rule 4) is used to generate command phrases where the verb is in the base form. The fifth phrase rule (rule 5) is used to generate commands where intransitive verbs are combined with adverbs.

The sixth phrase rule (rule 6) is used to generate phrases that contain an auxiliary verb (aux) indicating tense, mood, and/or agreement with the verb argument. In this case, the main verb is in its base or participle form and carries no tense and no agreement. Children typical do not use many auxiliary verbs in sequence, as in "I will have been reading this book", but they may use one or two, as in "I will see you soon" or "I have done it." It is useful to encode a separate fuel for phrases with multiple auxiliary verbs.

The seventh phrase rule (rule 7) is used to generate phrases where the adjective (ap is the adjective phrase or word), not the verb "be", selects the verb argument semantic group. The eighth phrase rule (rule 8) is used to generate phrases where the main predicate that selects the verb argument is a prepositional phrase (pp is the prepositional phrase) and the verb "be" only acts as a copula to express tense and agreement, e.g., "we were in the yard" compared with "I am in the yard." This type of phrase is very common in child language and therefore should be generated. However, only a small number of prepositional phrases may serve as predicates, e.g., those indicating location (at/in/on) and possession (with/without).

Figure 4B:
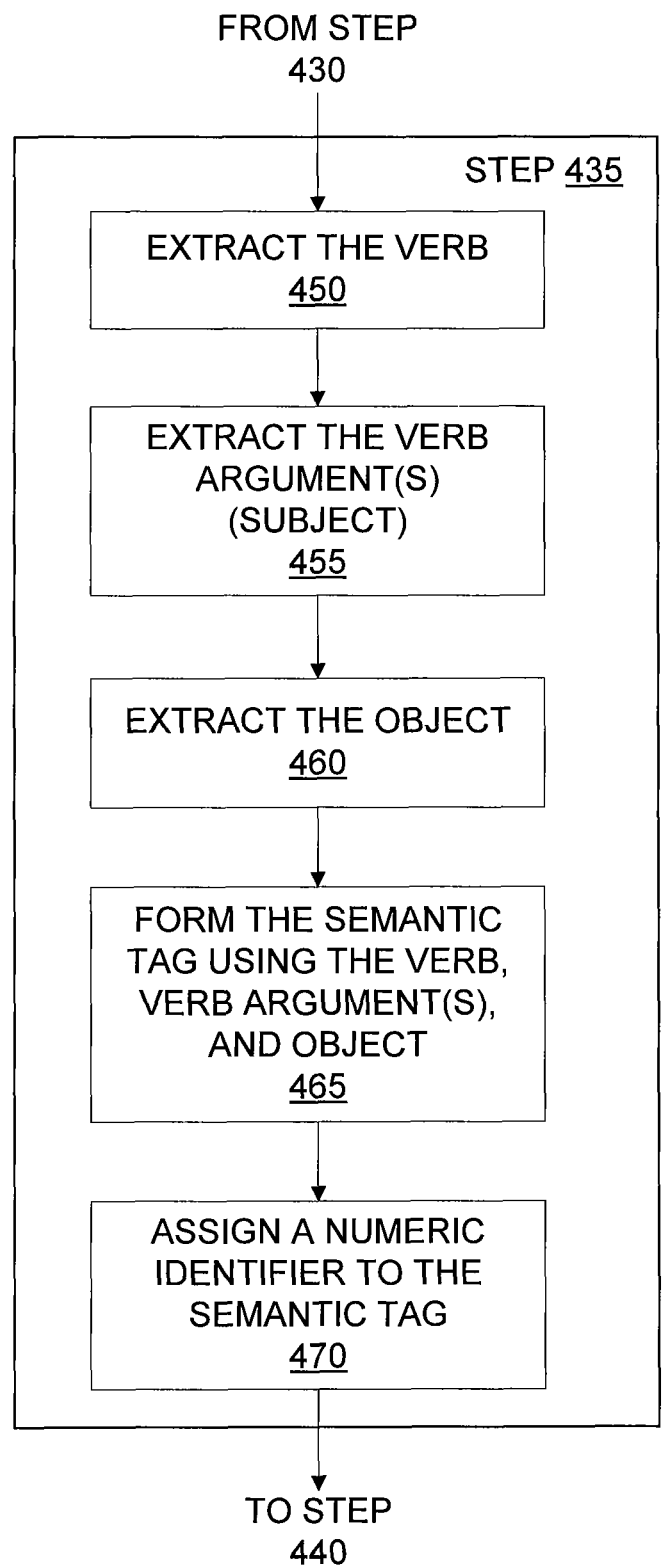
FIG. 4B is a flowchart further illustrating one of the method steps shown in FIG. 4A, according to one embodiment of the invention.

FIG. 4B is a flowchart further illustrating method step 435 shown in FIG. 4A, according to one embodiment of the invention. The final step in phrase generation is extracting the core meaning of the generated phrase and tagging the generated phrase with a semantic tag based on the core meaning. The semantic tag is especially crucial for translating a phrase from one language to another. Importantly, the core meaning may be extracted automatically. In one embodiment, the phrase generation engine 342 may perform method step 435. As shown, at step 450 the verb, i.e., action, of the generated phrase is extracted. At step 455 the verb argument, i.e., who is performing the action (in English this is the verb argument in most cases), of the generated phrase is extracted. At step 460 the object, i.e., to whom the action happens, of the generated phrase is extracted if there is an object.

At step 465 the extracted verb, verb argument, and object (if any) are used to form the semantic tag for the generated phrase. More specifically, in one embodiment, the verb is placed outside of parenthesis and the verb argument and the object are placed inside of the parenthesis. At step 470 a numeric identifier is assigned to the semantic tag.

To illustrate how phrase generation engine 342 automatically generates the semantic tag for a generated phrase, consider the phrase "Puffles eat pizza." The verb=eat; verb argument=puffles; and object=pizza. The semantic tag=eat (puffles, pizza) and a numeric identifier of 5545 is assigned to the semantic tag.

Figure 5A:
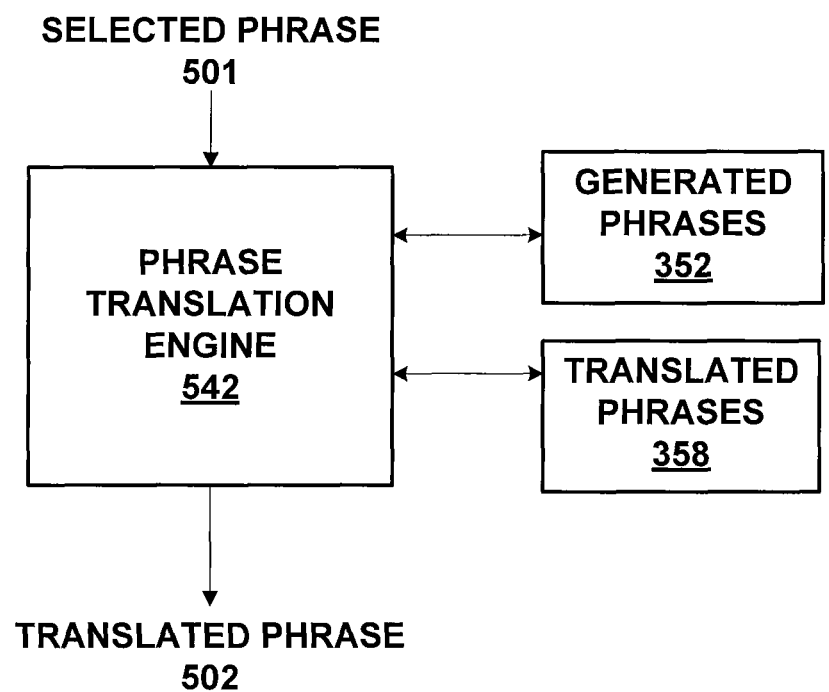
FIG. 5A is a conceptual diagram of the phrase generation components when translation of a phrase is performed to implement one or more aspects of the present invention.

FIG. 5A is a conceptual diagram of the phrase generation components, including a phrase translation engine 542 that is configured to implement one or more aspects of the present invention. Phrase chat may advantageously allow children from different linguistic backgrounds to communicate with each other. When a Spanish speaking user selects "hola!", an English speaking user can see "hello!". The semantic tags that are associated with the generated phrases in generated phrases 352 and translated phrases 358 may be used to translate multi-word phrases. To accomplish this, generated phrases for each language are each tagged with a core meaning, the semantic tags are then translated, and a matching phrase is retrieved from the translated generated phrases.

The phrase translation engine 542 may be configured to translate a selected phrase 501 in a first language by matching the semantic tag for the selected phrase 501 to a semantic tag for a phrase in translated phrases 358. The translated phrase corresponding to the matching semantic tag is read from the translated phrases 358 to produce the translated phrase 502 in a second language.

The generated phrases 352 includes phrases generated in English and corresponding semantic tags. The translated phrases 358 includes phrases generated in Spanish and corresponding semantic tags. Note that the translated phrases 358 are generated using translated annotated words 356 in Spanish and phrase rules 360 includes phrase formation rules for the Spanish language. For example, using the following annotated words in Spanish, a phrase corresponding to the English "Puffles eat pizza" may be generated and tagged:

Comer {verb, base form subj: human, animal; object: food}=eat

Comen={verb, 3rd person plural, present tense}

Los puffles {noun, 3rd person, plural masculine, animal}=puffles

Pizza {noun, 3rd person, pl. feminine, food}=pizza

The phrase translation engine 542 uses the translated annotated words 356 to generate the phrase, "Los puffles comen pizza" The semantic tag reflecting the core meaning of the generated phrase is comer(actor=puffles, acted_on=pizza). The generated phrase is then assigned a numeric identifier of 5466s. Note that the semantic tag that is generated for the same phrase in English is Eat (actor=puffles, acted_on=pizza). The words in the tag for the English phrase can be translated directly into Spanish, e.g., "eat(actor=puffles, acted_on=pizza)"="comer(actor=puffles, acted_on=pizza)". The ID of the English phrase may be 5466 or a different value. Importantly, the Spanish phrase and the English phrase have matching semantic tags.

While complete phrases generally cannot be translated word-by-word from another language due to differences in grammar, a tag is very minimal, and is therefore amenable to direct translation. As a result of translating the semantic tag, the matching tag in Spanish "comer(actor=puffles, acted_on=pizza)" is determined, and the translated phrase can then be retrieved from the translated phrases 358 using the semantic tag or the numeric identifier. The translated phrase 502 that is output to the client system 130 specified by the user sending the selected phrase 501, may be represented by the numeric identifier or by the semantic tag. Therefore, the server computing system 105 does not necessarily output the translated phrase read from translated phrases 358 since the client system 130 also stores the translated phrases 358.

Figure 5B:
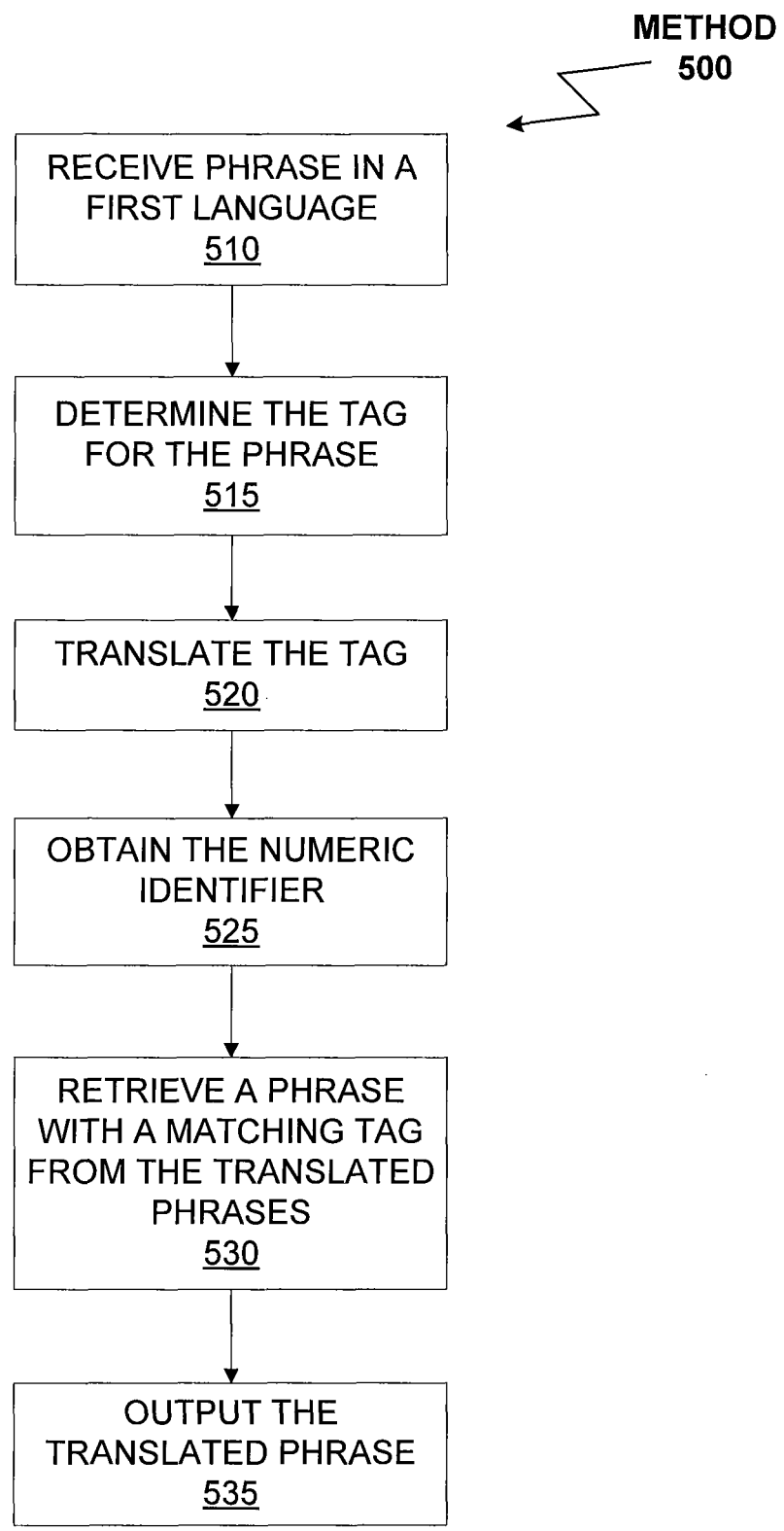
FIG. 5B is a flowchart of method steps describing the translation of phrases, according to one embodiment of the invention.

FIG. 5B is a flowchart of method steps 500 describing the translation of phrases, according to one embodiment of the invention. Persons skilled in the art would understand that, even though the method is described in conjunction with the systems of FIGS. 1, 2A, and 3A, any system configured to perform the method steps, in any order, is within the scope of embodiments of the invention. In one embodiment, the virtual world server application 335 may perform the method 500. As shown, the method 500 begins at step 510, where the phrase translation engine 542 receives a selected phrase in a first language. At step 515, the phrase translation engine 542 determines the semantic tag for the selected phrase. At step 520, the phrase translation engine 542 translates the semantic tag in the first language to produce a semantic tag in the second language. At step 530, the semantic tag in the second language is compared with semantic tags corresponding to the translated phrases 358, and a phrase that matches the semantic tag is read from the translated phrases. At step 535, the translated phrase that is retrieved from translated phrases 358 is output by the chat component 340. The numeric identifier associated with the translated phrase may be used to read the translated phrase.

Advantageously, embodiments of the invention described above may be used to enhance the user experience of individuals using chat functions in online environments. In sum, generative phrase chat allows for a significant augmentation of manually identified safe phrases. Phrases are automatically generated from a set of approved words that are annotated with semantic and grammatical information. The semantic and grammatically annotated words are combined into phrases via language-specific rules. The phrase translation engine 542 also facilitates a semi-automated translation process by first building the phrases in the relevant languages, tagging them with semantic tags that correspond to the phrases' core meaning, and then retrieving the phrase corresponding to the tag in the target language. This process reduces translation overhead significantly, since phrases are not actually translated word by word. Instead, a phrase is generated from the words and rules of a given language and then retrieved from the translated phrases 258 upon request.

Those skilled in the art will recognize that described systems, devices, components, methods, or algorithms may be implemented using a variety of configurations or steps. No single example described above constitutes a limiting configuration or number of steps. For example, configurations of the system 100 exist in which the described examples of components therein may be implemented as electronic hardware, computer software, or a combination of both. Illustrative examples have been described above in general terms of functionality. More or less components or steps may be implemented without deviating from the scope of this disclosure. Those skilled in the art will realize varying ways for implementing the described functionality, but such implementation should not be interpreted as a departure from the scope of this disclosure.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating phrases, the method comprising:
  receiving a dictionary storing a plurality of words of a first language and annotated with grammatical information and semantic information, wherein the annotated words are organized into groups based on meanings of the annotated words, wherein the annotated words in the dictionary are approved for use in a chat environment, and wherein the semantic information specifies a category for each word in the plurality of words based on a semantic meaning of that word;
  generating, by operation of one or more computer processors, a plurality of chat phrases of the first language using combinations of the annotated words based on the grammatical information, semantic information, phrase formation rules, and the groups, wherein each phrase formation rule specifies how to generate one or more of the chat phrases by combining words from the dictionary based on the grammatical information and the semantic information;
  storing the generated chat phrases in a memory;
  creating a semantic tag for a first chat phrase of the plurality of chat phrases, wherein the semantic tag includes a plurality of words extracted from the first chat phrase;
  translating the plurality of words within the semantic tag into a translated semantic tag of a second language;
  translating the first chat phrase into a second chat phrase represented in the second language, by determining the second chat phrase matching the translated semantic tag; and
  transmitting the second chat phrase to a client device of an online environment.

2. The method of claim 1, wherein the semantic tag includes a verb and a verb argument extracted from the first chat phrase.

3. The method of claim 2, wherein the semantic tag includes an object extracted from the first chat phrase.

4. The method of claim 2, further comprising assigning a numeric identifier to the semantic tag.

5. The method of claim 2, further comprising storing the semantic tag in the memory.

6. The method of claim 2, further comprising translating the verb and verb argument from the first language to the second language to produce the translated semantic tag.

7. The method of claim 6, further comprising retrieving the second chat phrase that is represented in the second language and corresponds to the translated semantic tag.

8. The method of claim 1, wherein the phrase formation rules include a first set of rules corresponding to the first language and a second set of phrase rules corresponding to the second language and the annotated words include a first set of annotated words that are represented in the first language and a second set of annotated words that are represented in the second language.

9. The method of claim 1, further comprising:
  receiving a selection from a first user of the online environment of the first chat phrase of the plurality of chat phrases; and
  sending the second chat phrase to at least a second user of the online environment.

10. A system comprising:
  a processor; and
  a memory, wherein the memory includes a phrase generation engine, which, when executed on the processor, performs an operation that generates phrases, the operation comprising:
    receiving a dictionary storing a plurality of approved words of a first language that are annotated with grammatical information and semantic information, wherein the annotated words are organized into groups based on meanings of the annotated words, wherein the annotated words in the dictionary are approved for use in a chat environment, and wherein the semantic information specifies a category for each word in the plurality of words based on a semantic meaning of that word;

generating a plurality of chat phrases of the first language using combinations of the annotated words based on the grammatical information, semantic information, phrase formation rules, and the groups, wherein each phrase formation rule specifies how to generate one or more of the chat phrases by combining words from the dictionary based on the grammatical information and the semantic information;

storing the generated chat phrases in a storage device, creating a semantic tag for a first chat phrase of the plurality of chat phrases, wherein the semantic tag includes a plurality of words extracted from the first chat phrase;

translating the plurality of words within the semantic tag into a translated semantic tag of a second language;

translating the first chat phrase into a second chat phrase represented in the second language, by determining the second chat phrase matching the translated semantic tag; and transmitting the second chat phrase to a client device of an online environment.

11. A non-transitory computer-readable storage medium storing instructions that, when executed by a processor, cause a computer system to generate phrases, by performing the steps of:

receiving a dictionary storing a plurality of approved annotated words of a first language that are annotated with grammatical information and semantic information, wherein the annotated words are organized into groups based on meanings of the annotated words, wherein the annotated words in the dictionary are approved for use in a chat environment, and wherein the semantic information specifies a category for each word in the plurality of words based on a semantic meaning of that word;

generating a plurality of chat phrases of the first language using combinations of the annotated words based on the grammatical information, semantic information, phrase formation rules, and the groups, wherein each phrase formation rule specifies how to generate one or more of the chat phrases by combining words from the dictionary based on the grammatical information and the semantic information; and storing the generated chat phrases in a memory;

creating a semantic tag for a first chat phrase of the plurality of chat phrases, wherein the semantic tag includes a plurality of words extracted from the first chat phrase;

translating the plurality of words within the semantic tag into a translated semantic tag of a second language;

translating the first chat phrase into a second chat phrase represented in the second language, by determining the second chat phrase matching the translated semantic tag; and transmitting the second chat phrase to a client device of an online environment.

12. A computer-implemented method for translating phrases, the method comprising:

receiving a first generated phrase that is represented in a first language, wherein the first phrase is a chat message generated using a phrase formation rule specifying a rule for combining words from a dictionary of approved words based on grammatical information and semantic information associated with the approved words in the dictionary, wherein the semantic information specifies a category for each word in the dictionary of approved words based on a semantic meaning of that word;

determining a semantic tag for the first generated phrase, wherein the semantic tag includes a plurality of words extracted from the first generated phrase, wherein the plurality of words include a verb and a verb argument;

translating the plurality of words within the semantic tag into a second language to produce a translated semantic tag;

retrieving a second phrase represented in a second language that corresponds to the translated semantic tag; and transmitting the second phrase to a first user of an online environment.

13. The method of claim 12, wherein the first generated phrase is selected by a second user of the online environment.

14. The method of claim 13, further comprising receiving a first character of the first generated phrase that is entered by the second user to initiate phrase chat with the first user.

15. The method of claim 14, further comprising displaying a set of generated phrases including the first generated phrase, wherein the generated phrases in the set of generated phrase each have a first character that matches the first character that is entered by the second user.

16. The method of claim 12, wherein the second phrase is generated using combinations of words represented in the second language that are annotated with semantic and grammatical information and combined based on phrase formation rules that are specific to the second language.

17. The method of claim 12, wherein the semantic tag includes an object extracted from the first generated phrase the object is translated into a second language to produce the translated semantic tag.

18. The method of claim 12, wherein the retrieving of the second phrase comprises matching a numeric identifier associated with the first generated phrase with a corresponding numeric identifier associated with the second phrase.

19. The method of claim 12, further comprising storing the semantic tag in a memory.

20. A system comprising:

a processor; and a memory, wherein the memory stores a phrase translation engine, which, when executed on the processor, performs an operation that translates phrases, the operation comprising:

receiving a first generated phrase that is represented in a first language, wherein the first phrase is a chat message generated using a phrase formation rule specifying a rule for combining words from a dictionary of approved words based on grammatical information and semantic information associated with the approved words in the dictionary, wherein the semantic information specifies a category for each word in the dictionary of approved words based on a semantic meaning of that word;

determining a semantic tag for the first generated phrase, wherein the semantic tag includes a plurality of words extracted from the first generated phrase, wherein the plurality of words include a verb and a verb argument;

translating the plurality of words within the semantic tag into a second language to produce a translated semantic tag;

retrieving a second phrase represented in a second language that corresponds to the translated semantic tag; and transmitting the second phrase to a first user of an online environment.

21. A non-transitory computer-readable storage medium storing instructions that, when executed by a processor, cause a computer system to translate phrases, by performing the steps of:

receiving a first generated phrase that is represented in a first language, wherein the first phrase is a chat message generated using a phrase formation rule specifying a rule for combining words from a dictionary of approved words based on grammatical information and semantic information associated with the approved words in the dictionary, wherein the semantic information specifies a category for each word in the dictionary of approved words based on a semantic meaning of that word;

determining a semantic tag for the first generated phrase, wherein the semantic tag includes a plurality of words extracted from the first generated phrase, wherein the plurality of words include a verb and a verb argument;

translating the plurality of words within the semantic tag into a second language to produce a translated semantic tag;

retrieving a second phrase represented in a second language that corresponds to the translated semantic tag; and transmitting the second phrase to a first user of an online environment.

* * * * *